2,964,505

1,4 DIENES, POLYMERS THEREOF, AND PROCESS FOR PREPARING SAID DIENES

John J. Drysdale, Clifton Park Manor, Del., assignor to E. I. du Pont de Nemours and Company, Wilmington, Del., a corporation of Delaware No Drawing. Filed June 25, 1956, Ser. No. 593,353

12 Claims. (Cl. 260—82.3)

This invention relates to unsaturated organic compounds. More particularly, it relates to an improved method for preparing 1,4-dienes and to a new class of such dienes.

The 1,4-dienes have received little study in the past, and no general synthetic routes for their preparation have been developed. Since 1,4-dienes possess two isolated double bonds, they are of interest particularly in reactions involving preferential addition to one of the double bonds. For example, 1,4-dienes are of particular interest as comonomers for copolymerization with polymerizable ethylenic compounds such as 1,3-butadiene, methyl methacrylate, acrylonitrile and the like, to produce copolymers having novel and improved properties.

This invention has as an object the preparation of polymerizable monomers. A further object is the provision of new polymerizable monomers. Other objects will appear hereinafter.

These objects are accomplished by the process of this invention which comprises reacting allene at temperatures of at least 550 C. with a compound having a terminal methylene, $=CH_2$, group, having a chain of at least three carbons including said methylene group, having at least one hydrogen on the carbon $\beta$ to the methylene carbon, having on carbons alpha and beta to the methylene carcarbomethoxy, and monovalent hydrocarbon radicals of up to six carbons, free of aliphatic, i.e., non-aromatic or non-benzenoid, unsaturation, any remaining substituent being an alkyl radical of up to six carbons.

The process of this invention is illustrated by the following equation showing the reaction of allene with a preferred group of terminally unsaturated ethylenic compounds:

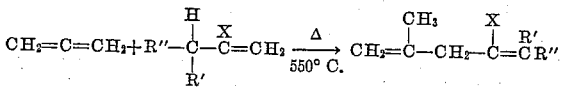

wherein X is H, CN, COOCH₃ or a monovalent hydrocarbon radical free of aliphatic unsaturation, i.e., free from non-aromatic or non-benzenoid unsaturation, and having up to six carbons, R' is H, CN, COOCH₃ or a monovalent hydrocarbon radical of up to six carbons and free of aliphatic unsaturation, R" is H or alkyl of up to six carbons. Preferably the total number of carbons in the terminally unsaturated ethylenic compound is not over fourteen. Particular groups of terminally unsaturated ethylenic compounds that are especially useful in the process of this invention include: cyanohydrocarbons having the cyano group on carbon doubly bonded to a methylene, $=CH_2$, group and singly bonded to a hydrogen-bearing carbon of a monovalent hydrocarbon radical which is free of aliphatic unsaturation; carbomethoxyhydrocarbons having the carbomethoxy group or carbon doubly bonded to a methylene, $=CH_2$, group and singly bonded to a hydrogen-bearing carbon of a monovalent hydrocarbon radical which is free of aliphatic unsaturation; and an arylolefin having the aryl group on carbon doubly bonded to a methylene, $=CH_2$, group and singly bonded to a hydrogen-bearing carbon of a monovalent hydrocarbon radical which is free of aliphatic unsaturation.

The above process and its alternative, described below, can be employed to prepare the novel products of this invention. These have the following general formula

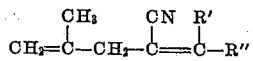

wherein R' is H, CN, or a monovalent hydrocarbon radical free of aliphatic unsaturation and containing up to six carbons, and R" is H or alkyl of up to six carbon atoms. Polymers of these 1,4-dienes form a part of the present invention.

While the reaction of allene with the terminally unsaturated ethylenic compound can be carried out at temperatures above 550° C., it is preferred that temperatures of 600° to 700° C. be employed since they give better yields of the desired 1,4-dienes. When temperatures above 700° C. are used, larger amounts of undesired by-products are formed.

The reaction is preferably carried out at atmospheric or slightly reduced pressures. Superatmospheric pressures can be used but are not desirable in this process since they tend to increase dimerization of the allene. Reduced pressures, i.e., pressures down to about 300 mm. Hg, can be used if desired. Lower pressures are not desirable since they tend to reduce the conversion of the reactants to the desired 1,4-dienes.

The reaction time is not critical in the process of this invention. However, short contact times are preferred since they tend to suppress side reactions. Similarly, the rate of cooling the reaction mixture from the reaction temperature is not critical. However, while rapid cooling is not essential, it does increase the yield of the 1,4-dienes obtained and is, therefore, preferred. Cooling of the reaction mixture immediately after it leaves the reaction zone in a trap cooled by a mixture of acetone and solid carbon dioxide gives satisfactory results.

The process of this invention can be carried out in conventional types of reaction vessels. Reactors constructed of any inert heat-resistant material can be employed. For example, the reactor can be made of quartz, heat-resistant glass, stainless steel or other inert metal. The reactor can, if desired, be packed with inert materials, e.g., granular quartz, to provide better heat transfer. The reaction zone can be heated by conventional means. Electric heaters are very satisfactory for this purpose. One type of reactor which gives satisfactory results in the process of this invention consists of a vertical cylindrical reaction tube approximately 1" in diameter and 12" long made of quartz or of a heat-resistant glass, e.g., the type of glass known commercially as "Vycor." The reaction tube is packed with 6 mm. sections of quartz tubing 6 mm. in diameter and is heated externally by means of a cylindrical electric furnace. The temperature of the reaction zone is recorded by a thermocouple placed in the center of the reaction tube. The exit gases from the reaction tube are led to a cold trap which is cooled, for example, by a mixture of acetone and solid carbon dioxide. The allene and the terminally unsaturated ethylenic compound are introduced into the reaction zone gradually by conventional means, e.g., by means of a dropping funnel or by distillation, or by means of metering pumps. When it is desired to operate the reaction under reduced pressure, a high-capacity vacuum pump can be connected to the reaction system to maintain the reaction system at the desired pressure. The pressure in the system is measured between the pump and the cold trap in which the products are isolated.

The reactants used in the process of this invention can be the grades commercially available for use in polymerization. However, best results are obtained when the allene is relatively pure.

An alternative process that can be used to prepare 1,4-dienes comprises pyrolyzing at 550° to 850° C., and preferably at 600–700° C., under a pressure of less than 1 atmosphere, and preferably at a pressure of 1–50 mm. mercury, the methylenecyclobutane adducts that are obtained by addition of allene to the terminally ethylenically unsaturated compound. In this method, less preferred because it introduces the step of adduct formation into the over-all process, the starting material is a methylenecyclobutane of the formula

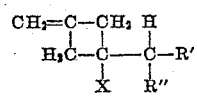

wherein X is CN, COOCH$_3$, or phenyl, R' is H, CN, COOCH$_3$, or a monovalent hydrocarbon radical free of aliphatic, i.e., non-aromatic or non-benzenoid, unsaturation of up to six carbon atoms, and R" is H or alkyl of up to six carbon atoms. Preferably the methylenecyclobutane contains not over 14 carbon atoms.

The methylenecyclobutane reactants for this alternative process can be prepared by heating to a temperature of 150° to 250° C., in the absence of a polymerization initiator, and preferably in the presence of a polymerization inhibitor, a mixture of allene and an excess of a substituted ethylene of the formula

wherein X, R', and R" have the same meaning as the terms in the formula for the methylenecyclobutanes. This process of making methylenecyclobutanes is described further in U.S. application Serial No. 532,376, filed September 2, 1955, by H. N. Cripps, now U.S. Patent No. 2,914,541 the disclosure whereof is hereby incorporated.

The pyrolyses of these methylenecyclobutanes can be carried out in the same type of apparatus as that employed for the preparation of the 1,4-dienes from allene and the terminally unsaturated ethylenic compounds described previously. However, the pyrolysis of the methylenecyclobutanes is preferably carried out under conditions giving as short a contact time at the operating temperature as possible since better yields of the 1,4-diene are obtained in this way. In order to get the reaction product out of the reaction zone as rapidly as possible so that formation of undesirable by-products is minimized, it is preferred to carry out the pyrolysis at reduced pressures, preferably at pressures of 1–50 mm. mercury. In this process it is also desirable to provide efficient cooling of the reaction products in order to condense the low boiling products and to maintain the desired low operating pressures in the reaction system.

The following examples in which parts are by weight are illustrative of the invention.

EXAMPLE I

A reaction tube of the type described above is heated to 600° C. at atmospheric pressure. To the reaction zone is added 100 ml. of methacrylonitrile at a rate of 1.3 ml. per minute. Allene is simultaneously introduced into the reaction zone at the rate of 8.5 liters per hour. The effluent reaction mixture is collected in a U-trap attached to the end of the reaction tube and chilled with a mixture of acetone and solid carbon dioxide. The reaction product is then distilled through an efficient fractionating column. After recovery of unreacted methacrylonitrile, there is obtained 5.5 ml. of 2-cyano-4-methyl-1,4-pentadiene boiling at 66–68° C./30 mm. Hg, and having a refractive index, $n_D^{25}$, of 1.4456–1.4470. The structure of this product is confirmed by nuclear magnetic resonance analysis, and it is identical to that of the product of Example V.

EXAMPLE II

To a reaction tube maintained at 600° C. at atmospheric pressure there is introduced 100 ml. of methyl methacrylate at the rate of 0.9–1.2 ml. per minute. Allene is simultaneously introduced into the reaction tube at the rate of 7–7.5 liters per hour. After the addition of the reactants is completed, the reaction mixture collected in the cold trap cooled by acetone-solid carbon dioxide is distilled. There is obtained, after recovery of unreacted methyl methacrylate, 6 ml. of 2-carbomethoxy-4-methyl-1,4-pentadiene boiling at 158–159° C. and having a refractive index, $n_D^{25}$, of 1.4450–1.4460. The structure of this product is confirmed by nuclear magnetic resonance analysis, and it is shown to be identical with the product of Example VI.

EXAMPLE III

Isobutylene and allene are introduced at the rate of 16–17 liters per hour and 6–7.5 liters per hour, respectively, into a reaction tube of the type used in the previous examples maintained at 650° C. and atmospheric pressure. The reaction mixture is collected in a trap cooled by a mixture of acetone and solid carbon dioxide. The reaction product is distilled and there is obtained 16 g. of material boiling at 70–105° C. Approximately 10 parts of maleic anhydride is added to this fraction to react with any 1,3-diene present, and the reaction mixture is distilled. There is obtained 3–4 g. of 2,4-dimethyl-1,4-pentadiene boiling at 79° C. Nuclear magnetic resonance analysis shows that this material is essentially pure 2,4-dimethyl-1,4-pentadiene containing a small amount of benzene.

EXAMPLE IV

A cylindrical reaction tube is heated to 600° C. and 3 g. of α-methylstyrene is introduced gradually over a period of two hours. Allene is simultaneously introduced into the tube at the rate of 7.5–8.5 liters per hour. During the addition of the reactants the internal reaction temperature rises to 620–630° C. The reaction mixture collected in the cold trap is distilled and, after recovering unreacted α-methylstyrene, there is obtained 4–5 g. of material boiling at 100–102° C./18 mm. having a refractive index, $n_D^{25}$, of 1.5386–1.5390. Infrared and nuclear magnetic resonance analyses show that this material is a mixture of 2-phenyl-4-methyl-1,4-pentadiene and 2-phenyl-4-methyl-1,3-pentadiene or 2-phenyl-4-methyl-2,4-pentadiene.

*Analysis*

Calculated for $C_{12}H_{14}$: C, 91.10%; H, 8.90%. Found: C, 90.53%; H, 9.21%.

The following two examples illustrate the process phase of the invention wherein the allene/olefin adduct, the methylenecyclobutane, is employed.

EXAMPLE V

A cylindrical reaction tube is maintained at 700° C. and 3 mm. Hg pressure. To the heated reaction zone is added 43 g. of 3-methyl-3-cyano-1-methylenecyclobutane during a period of 0.5 hour. The reaction mixture is collected in a U-trap which is cooled by liquid nitrogen. At the end of the addition the cold trap is removed from the pyrolysis system and the gaseous products are allowed to evaporate. The remaining liquid is distilled at reduced pressure and there is obtained approximately 20 g. of 2-cyano-4-methyl-1,4-pentadiene boiling at 65° C./30 mm. Hg, having a refractive index, $n_D^{25}$, of 1.4446.

*Analysis*

Calculated for $C_7H_9N$: C, 78.46%; H, 8.46%. Found: C, 78.78%; H, 8.62%.

The structure of this product is confirmed by infrared and nuclear magnetic resonance analyses.

EXAMPLE VI

To a hot reaction tube maintained at 650° C. and 4–6 mm. Hg pressure there is added gradually 40 g. of 3-methyl-3-carbomethoxy-1-methylenecyclobutane during a period of 0.5 hour. The reaction mixture is collected in a U-trap cooled by liquid nitrogen and is then worked up as described in Example V. On distillation, there is obtained 18.5 g. of material boiling at 160° C. Nuclear magnetic resonance analysis of this material indicates that it is a mixture of the starting cyclobutane and the desired 2-carbomethoxy-4-methyl-1,4-pentadiene. This product is repyrolyzed at 700° C. and 2–4 mm. pressure. On distillation of the liquid reaction product, there is obtained 15 g. of 2-carbomethoxy-4-methyl-1,4-pentadiene boiling at 160–161° C.

Analysis

Calculated for $C_8H_{12}O_2$: C, 68.54%; H, 8.56%. Found: C, 69.32%, H, 8.87%.

The structure of this product is confirmed by infrared and nuclear magnetic resonance analyses.

The present invention also includes the polymers, including copolymers, of the dienes of the formula

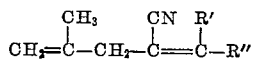

wherein R' is H, CN, or a monovalent hydrocarbon radical free of aliphatic unsaturation and containing up to six carbons, and R" is H or alkyl of up to six carbons. This phase of the invention is illustrated in Example VII below.

EXAMPLE VII

A mixture of 30 g. of butadiene, 10 g. of 2-cyano-4-methyl-1,4-pentadiene (prepared as described in Example V), 70 ml. of deoxygenated water, 2 g. of sodium oleate, 4 ml. of 3% aqueous potassium persulfate solution and 0.06 g. of dodecyl mercaptan is agitated in a closed vessel for eight hours at 50° C. The resulting latex is coagulated with a salt/acid mixture (saturated aqueous sodium chloride solution containing 1% sulfuric acid), washed with water and methanol, stabilized with phenyl β-naphthylamine, and dried at 50° C. under reduced pressure. There is obtained 31.2 g. of rubbery copolymer containing 3.9% nitrogen. On the basis of this nitrogen content, the copolymer contains 29.6%, by weight, of 2-cyano-4-methyl-1,4- pentadiene.

This rubbery copolymer is compounded with 40%, by weight, of carbon black, 2% sulfur, 5% zinc oxide, and 2% 2-mercaptothiazoline, and cured by heating at 140° C. for 60 minutes. Immersion of a sample of the vulcanizate in a 60/40 isooctane/toluene mixture results in an 85% volume increase in the vulcanizate. In comparison, a conventional butadiene/styrene synthetic rubber increases 120% in volume on immersion in this solvent mixture.

This invention has been illustrated in Examples I–IV by specific reference to the reaction of allene with certain terminally unsaturated ethylenic compounds resulting in the formation of certain 1,4-dienes. However, the invention is generic to the reaction of allene with any terminally unsaturated ethylenic compound of the formula

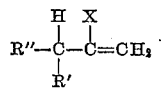

wherein X and R' each are hydrogen, cyano, carbomethoxy, or a monovalent hydrocarbon radical of up to six carbons and free from non-aromatic unsaturation and R" is hydrogen or alkyl of 1 to 6 carbons, i.e., is $(CH_2)_nH$ where $n$ is a cardinal number up to 6. Thus, the terminally ethylenically unsaturated compounds of Examples I–IV can be replaced by equivalent quantities of the following unsaturated compounds:

Itacononitrile,

Dimethyl itaconate,

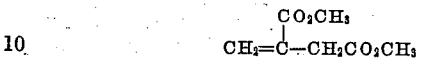

α-Benzylacrylonitrile,

Methyl α-methyleneisovalerate,

3-methyl-3-butenenitrile,

3-butenenitrile, $CH_2=CHCH_2CN$;
2-ethyl-1-hexene,

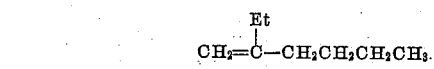

and α-ethylacrylonitrile,

with the formation of 2-(2-methyl-2-propenyl)-2-butenedinitrile; dimethyl 2-(2-methyl-2-propenyl)-2-butene-1,4-dioate; 2-benzylidene-4-methyl-4-pentenenitrile; methyl 2-isopropylidene-4-methyl-4-pentenoate; 3,5-dimethyl-2,5-hexadienenitrile and 3-methylene-5-methyl-5-hexenenitrile; 5-methyl-2,5-hexadienenitrile; 4-ethyl-2-methyl-1,4-octadiene and 4-n-butyl-2-methyl-1,4-hexadiene; and 2-ethylidene-4-methyl-4-pentenenitrile, respectively.

The 1,4-dienes of this invention can be polymerized, either alone or with one or more other addition polymerizable monomers by conventional addition polymerization techniques. In particular, they can be polymerized in solution, bulk or emulsion systems with free radical-liberating initiators, e.g., peroxides, persulfates and azo catalysts, as illustrated in Example VII.

The homopolymers of the dienes of this invention are useful in the preparation of films and molding compositions. Copolymers of the 1,4-dienes of this invention with monoethylenically unsaturated compounds are useful for the manufacture of films and coating compositions which can be insolubilized by vulcanization with conventional vulcanizing agents. The resulting vulcanized copolymers are resistant to organic solvents. Copolymers of 1,4-dienes of this invention containing nitrile groups are especially useful for copolymerization with conjugated dienes, e.g., 1,3-butadiene, to form vulcanizable rubbers that exhibit improved resistance to solvents. 1,4-dienes produced by this invention containing carbomethoxy groups are of especial value for copolymerization with conjugated dienes, e.g., 1,3-butadiene, to form rubbers that have improved flexibility at low temperatures. This particular property makes them of particular value for the manufacture of films that must retain their flexibility at low temperatures.

The 1,4-dienes produced in the process of this invention are also useful as chemical intermediates. The dienes having the formula

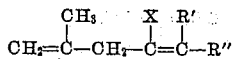

wherein X is CN or $COOCH_3$, R' is H, CN, $COOCH_3$, or a monovalent hydrocarbon radical free of aliphatic unsaturation and containing up to six carbons, and R" is H or alkyl of up to six carbons are particularly valuable because of the ability of the double bonds of these compounds to add reactants separately, i.e., add to one double bond but not the other. This type of 1,4-diene is capable of adding active hydrogen-containing compounds, e.g., alcohols, ammonia, amines having hydrogen on amino nitrogen, hydrogen sulfide, water, etc. By proper selection of reactants and conditions, addition to one or the other of the double bonds can be obtained. Basic catalysts generally favor addition to the double bond having the cyano or carbomethoxy activating group attached to it; while acid catalysts favor addition to the other double bond, i.e., the one having no activating group attached to it.

Thus, 27 parts of 2-methylene-4-methyl-4-pentenenitrile added dropwise to a stirred solution of 100 parts of elthylamine in 25 parts of water and 50 parts of dioxane at 0° C. and the mixture allowed to stand overnight at room temperature, refluxed 2 hours, the excess amine removed by distillation, the aqueous layer separated and the organic layer distilled gives 15 parts of 2-(ethylamino-methyl)-4-methyl-4-pentenenitrile, boiling at 94–95° C./ 5 mm. The center cut of this product has a refractive index, $n_D^{23.5}$, of 1.4532 and a neutral equivalent of 153 and 154 (calculated neutral equivalent is 152). The nuclear magnetic resonance spectrum obtained with this compound is consistent with the assigned structure.

As another example, 39.5 parts of ethyl alcohol and 2 parts of sodium methylate added to 14 parts of 2-methylene-4-methyl-4-pentenenitrile, and allowed to stand at room temperature, yields on distillation after addition of 5 parts of acetic acid, 5 parts of 2-(ethoxymethyl)-4-methyl-4-pentenenitrile, boiling at 82–84° C./5.5 mm. and having a refractive index, $n_D^{25}$, of 1.4313.

In addition to their use in the formation of copolymers by addition polymerization with other polymerizable ethylenic monomers, the 1,4-dienes having carbomethoxy groups can be used to modify preformed polymers having free hydroxyl groups. For example, polyvinyl alcohol can be reacted with methyl 2-methylene-4-methyl-4-pentenoate by ester interchange to form a polyester having lateral unsaturation which can be cured by conventional vulcanizing agents.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for the preparation of dienes which comprises reacting allene at a temperature of at least 550° C. with a compound having a terminal methylene, =CH$_2$, group, having a chain of at least three carbons including said methylene group, having at least one hydrogen on the carbon β to the methylene carbon, having on each carbon alpha and beta to the methylene carbon a member of the class consisting of hydrogen, cyano, carbomethoxy, and monovalent hydrocarbon radicals of up to six carbons, free of aliphatic unsaturation, any remaining substituent being an alkyl radical of up to six carbons.

2. Process of claim 1 wherein the allene and the terminally unsaturated ethylenic compound are supplied to the reaction zone as an adduct of the two compounds, said adduct having the formula

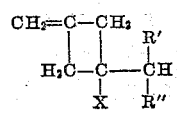

wherein X is a member of the group consisting of cyano, carbomethoxy and phenyl, R' is a member of the group consisting of hydrogen, cyano, carbomethoxy and monovalent hydrocarbon radicals of up to six carbons and free of aliphatic unsaturation and R" is selected from the group consisting of hydrogen and alkyl of up to six carbons.

3. Process for the preparation of dienes which comprises reacting allene at a temperature of at least 550° C. with a terminally ethylenically unsaturated compound of the formula

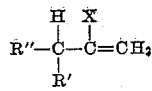

wherein X and R' are each selected from the class consisting of hydrogen, cyano, carbomethoxy, and monovalent hydrocarbon radicals of up to six carbons and free of aliphatic unsaturation and R" is selected from the class consisting of hydrogen and alkyl of up to six carbons.

4. Process of claim 3 wherein the allene and the terminally unsaturated ethylenic compound are supplied to the reaction zone as an adduct of allene with the terminally unsaturated ethylenic compound, said adduct being a methylene cyclobutane having only hydrogen on the 2- and 4-carbons, in which methylenecyclobutane the 3-carbon with its substitutents forms a hydrocarbon radical of up to 10 carbons and free of aliphatic unsaturation, said hydrocarbon radical having one substituent and that on said 3-carbon and of the class consisting of cyano, carbomethoxy, and phenyl.

5. Process which comprises reacting allene at a temperature between 600 and 700° C. with a cyanohydrocarbon having the cyano group on carbon doubly bonded to a methylene, =CH$_2$, group and singly bonded to a hydrogen-bearing carbon of a monovalent hydrocarbon radical of up to 14 carbon atoms which is free of aliphatic unsaturation.

6. Process which comprises reacting allene at a temperature between 600 and 700° C. with a carbomethoxyhydrocarbon having the carbomethoxy group on carbon doubly bonded to a methylene, =CH$_2$, group and singly bonded to a hydrogen-bearing carbon of a monovalent hydrocarbon radical of up to 14 carbon atoms which is free of aliphatic unsaturation.

7. Process which comprises reacting allene at a temperature between 600 and 700° C. with an arylolefin having the aryl group on carbon doubly bonded to a methylene, =CH$_2$, group and singly bonded to a hydrogen-bearing carbon of a monovalent hydrocarbon radical of up to 14 carbon atoms which is free of aliphatic unsaturation.

8. Process which comprises pyrolyzing, at a temperature of at least 550° C. a methylenecyclobutane of the formula

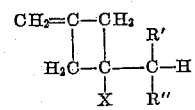

wherein X is a member of the group consisting of cyano, carbomethoxy and phenyl, R' is selected from the group consisting of hydrogen, cyano, carbomethoxy and monovalent hydrocarbon radicals of up to six carbons and free of aliphatic unsaturation and R" is selected from the group consisting of hydrogen and alkyl of up to six carbons.

9. A 1,4-diene of the formula

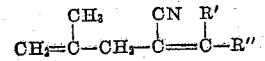

wherein R′ is a member of the class consisting of CN, H, and monovalent hydrocarbon radicals of up to six carbons and free of aliphatic unsaturation, and R″ is a member of the class consisting of H and alkyl radicals of up to six carbons.

10. A polymer of a 1,4-diene of claim 9.

11. A copolymer of a diene according to claim 9 and a polymerizable conjugated diene.

12. A copolymer of a 4-cyano-1,4-diene of claim 9 with butadiene.

References Cited in the file of this patent

UNITED STATES PATENTS

| | | |
|---|---|---|
| 2,540,073 | Van Hook et al. | Jan. 30, 1951 |
| 2,641,607 | Albisetti et al. | June 9, 1953 |
| 2,664,449 | Miller | Dec. 29, 1953 |
| 2,754,323 | Anderson | July 10, 1956 |

OTHER REFERENCES

Hinder et al.: Chem. Abst. 42, 2930c (1948).

UNITED STATES PATENT OFFICE
CERTIFICATION OF CORRECTION

Patent No. 2,964,505                                              December 13, 1960

John J. Drysdale

It is hereby certified that error appears in the above numbered patent requiring correction and that the said Letters Patent should read as corrected below.

Column 1, line 35, for "550 C." read -- 550° C. --; line 39, after "car-" insert -- bon up to one substituent of the class consisting of cyano, --; column 6, line 29, at the end of the formula insert a semicolon.

Signed and sealed this 20th day of June 1961.

(SEAL)

Attest:

ERNEST W. SWIDER                                          DAVID L. LADD

Attesting Officer                                              Commissioner of Patents